Oct. 18, 1927.

C. D. BRACKELSBERG 1,646,273

TILTING APPARATUS FOR HARROWS

Filed June 28, 1926  2 Sheets-Sheet 2

Inventor
Casper D. Brackelsberg

By *[signature]*

Attorney

Patented Oct. 18, 1927.

1,646,273

UNITED STATES PATENT OFFICE.

CASPER D. BRACKELSBERG, OF MADELIA, MINNESOTA.

TILTING APPARATUS FOR HARROWS.

Application filed June 28, 1926. Serial No. 119,088.

It is a purpose of the present invention to provide, in a harrow tilting apparatus, a series of levers so arranged upon a forward frame of the harrow sections, in conjunction with operative connections with said sections, whereby, upon movement of certain of the levers forwardly, the central harrow sections may be elevated or tilted upwardly, and a backward movement of the same levers may tilt the end harrow sections.

It is obvious that, in using a harrow, rubbish usually accumulates by clinging to the teeth of the harrow sections. To remove the rubbish, it is necessary to lift the harrow sections and to facilitate this lifting process, it is another purpose to provide levers mounted on the frame, whereby the central sections may be tilted upwardly and the end sections likewise tilted.

Still another purpose is to provide a pair of tilting levers consisting of lever sections which are operatively connected with the harrow sections and including abutment means for such lever sections so that, when certain of said lever sections are tilted forwardly, the central harrow sections may be tilted up in order to permit the removal of the rubbish. When said actuating lever sections are tilted rearwardly, they cooperate with abutments, causing the end harrow sections to tilt upwardly, obviously permitting the removal of the rubbish and trash which may accumulate on the teeth of the harrow.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 5 is a cross sectional view through the parts 16, 17, 18 and 19.

Figure 1:
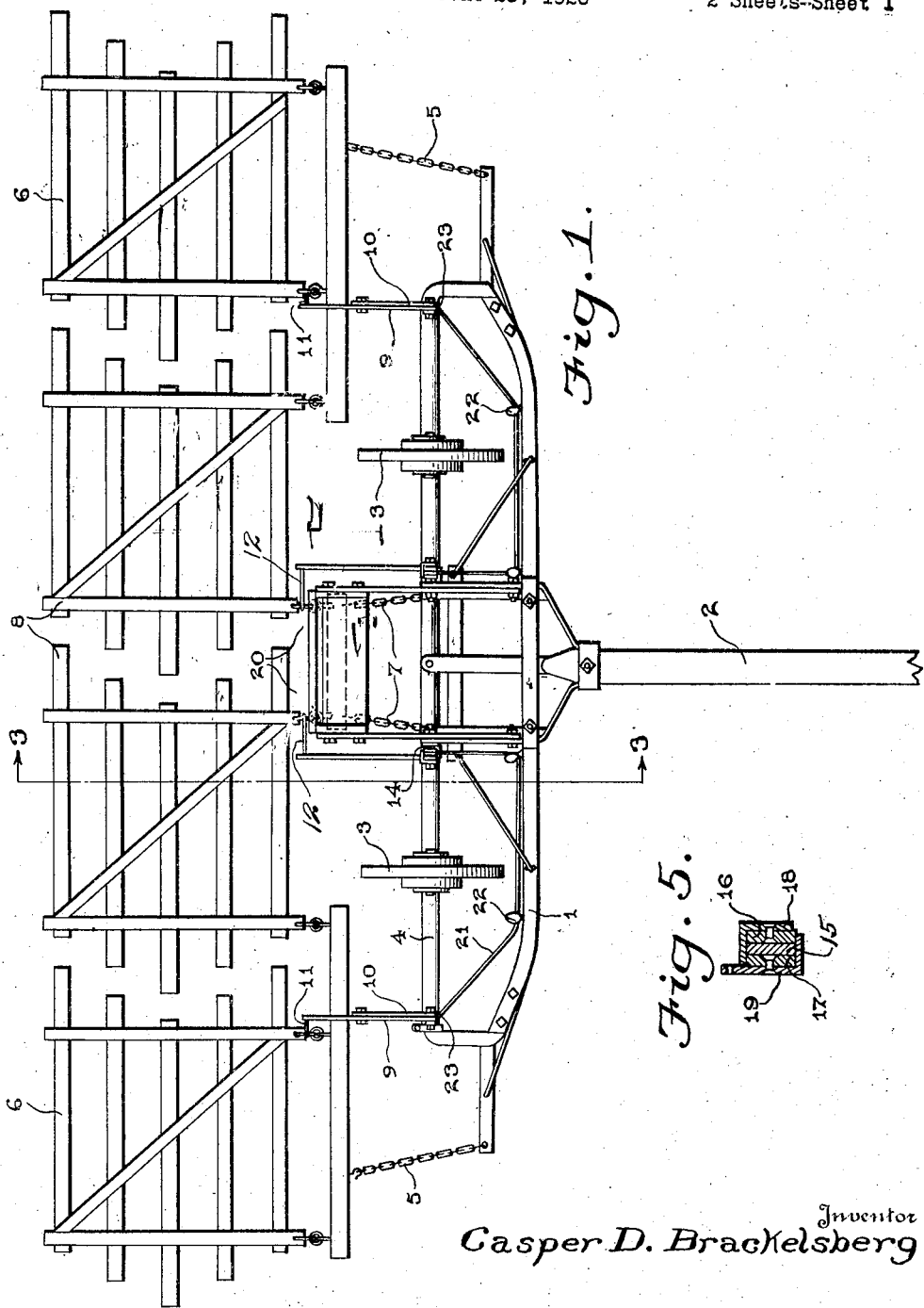
Figure 1 is a view in plan of a harrow, showing the improved harrow tilting apparatus applied in accordance with the invention.
Figure 2:
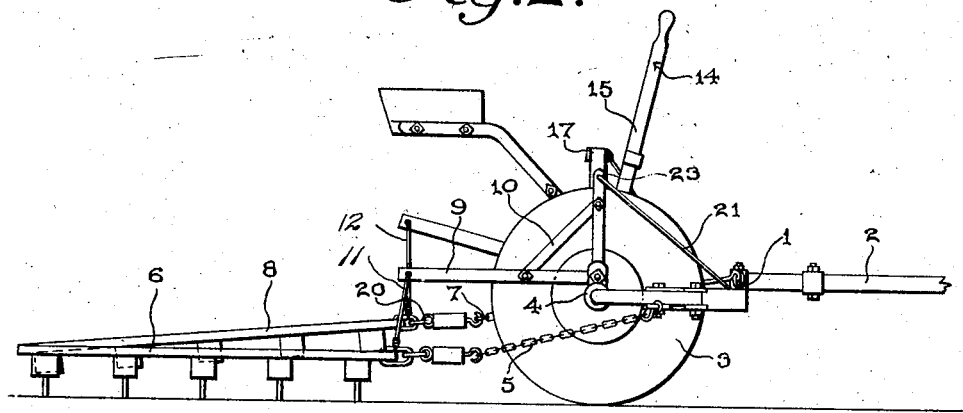
Figure 2 is a side view, showing the central harrow sections tilted.
Figure 3:
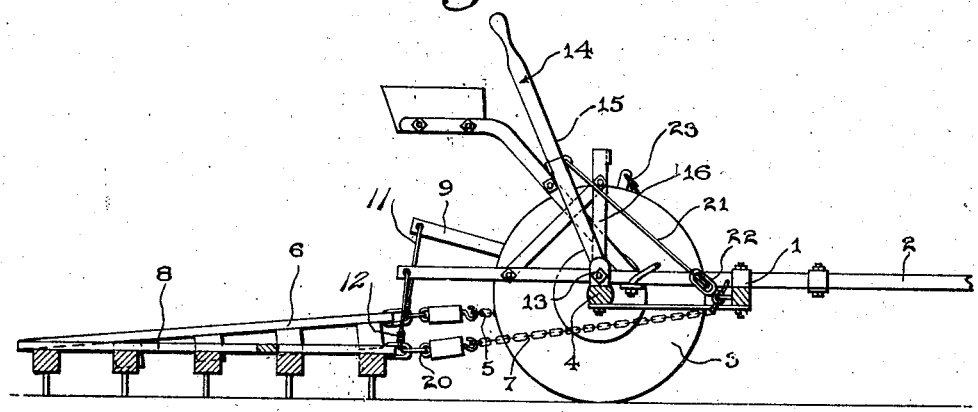
Figure 3 is a sectional view on line 3—3 of Figure 1, showing certain of said operating lever sections tilted rearwardly and the end harrow sections as tilted upwardly.
Figure 4:
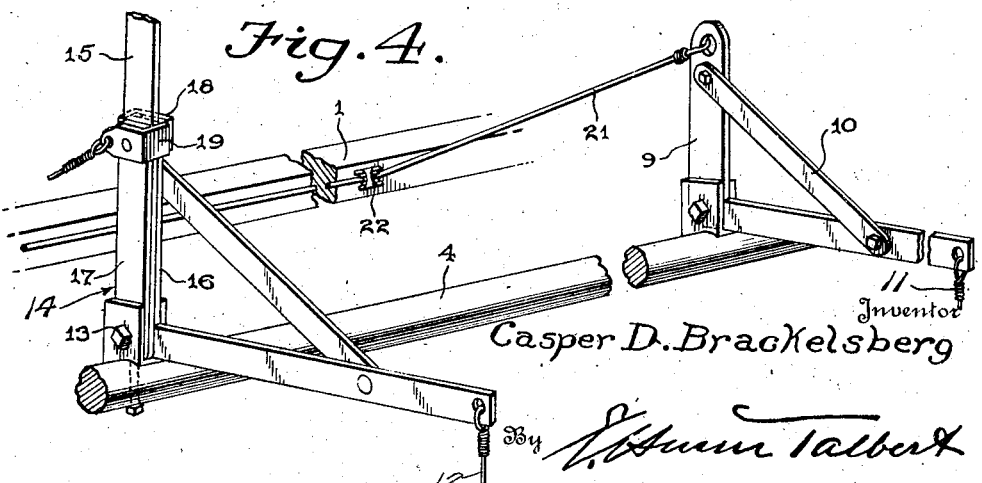
Figure 4 is an enlarged detail view of a portion of the harrow frame and the axle therefor and showing the tilting levers applied and their connections for the harrow sections.

Referring to the drawings, 1 designates the advanced frame of the harrow including a tongue or pole 2 to which draft animals may be attached for drawing the harrow over a field. The frame 1 and the supporting wheels 3 are substantially similar to the corresponding parts disclosed in patent to T. E. Marshall, No. 1,435,075. The supporting wheels 3 are mounted upon an axle 4 which supports the frame.

Operatively connected by chains 5 to the end portions of the frame 1 are end harrow sections 6. Also connected to the frame by means of chains 7 are central harrow sections 8. It will be noted, upon observation of the drawings, that the harrow sections are aligned and in parallelism. Operatively mounted upon the ends of the axle 4 are tilting bell crank levers 9, the upright arms of which are connected by links or similar means with the frame of the harrow, yet permitting the bell crank levers to tilt when operated. The arms of these bell crank levers are reinforced through the medium of the braces 10. The other arms of the bell crank levers have flexible connections 11 with the end harrow sections.

Connected with the central harrow sections by flexible connections 12 and fulcrumed on the axle 4 by means of U-shaped brackets 13 which are secured to the axle are bell crank levers 14. These levers 14 consist of the major operating section 15 and the independently operating lifting sections 16 and 17. The lifting and operating sections of each lever 14 are pivoted on a common pin carried by the bracket 13. The lifting section 16 is of right angular construction of which the upright arm corresponds to and is coextensive with the lifting section 17. Both the lifting sections are provided with angular brackets 18 and 19 so positioned as to overlie the opposite edges of the operating section 15. Thus when said operating section is moved in one direction the lifting section 16 is operated and when moved in the opposite direction the lifting section 17 is operated.

When the major lever sections 15 are tilted rearwardly, they will abut with the angle brackets 19, hence causing the lever sections 17 to move with the sections 15. Connected to the lever sections 17 are chains or cables 21 which pass over pulleys 22 and are, in turn, connected at 23 to the upwardly projecting arms of the tilting bell crank levers 9. Obviously, when the major lever sections 15 are tilted rearwardly, they will exert pulling actions on the chains or cables and thereby tilt the bell crank levers 9 which, in turn, will tilt the end harrow sections upwardly through the medium of the chains 11.

By providing bell crank levers, such as 14, it is possible to move the major lever sections 15 rearwardly without disturbing the positions of the lever sections 16, and when moving the major sections 15 forwardly, it is possible to tilt the lever sections 16 without affecting the lever sections 17. By this arrangement of levers and operative connections with the central and end harrow sections, it is possible to raise or tilt the harrow sections at their forward portions to permit the removal of rubbish, trash and the like from the teeth of the harrow.

The invention having been set forth, what is claimed is:

1. In a harrow, the combination with an advanced frame, of a plurality of harrow sections operatively disposed in alignment transversely at the rear of the frame, bell crank levers mounted on the frame, each bell crank lever comprising independently movable arms, certain of which are operatively connected to certain of the harrow sections, the other sections of the bell crank levers being operatively connected to the end harrow sections, and means cooperating between the arms of said bell crank levers, whereby the movement of one of the arms of each bell crank lever in one direction or the other may tilt one of the harrow sections at its forward end independently of and without disturbing the remaining harrow sections.

2. In a harrow, the combination with a frame, of a plurality of harrow sections disposed in trailing relation to the frame, bell crank levers mounted on the frame and having one arm connected each with one of the harrow sections, and a major lever mounted upon the frame and engageable with one of the bell crank levers when moved in one direction and having a flexible connection with the other bell crank lever, said flexible connection being put under tension when the major lever is moved in the other direction.

In testimony whereof he affixes his signature.

CASPER D. BRACKELSBERG.